Aug. 28, 1956 D. A. ARMSTRONG 2,760,613
SPRING CLUTCH FOR OUTBOARD MOTORS AND THE LIKE
Filed April 2, 1954 2 Sheets-Sheet 1

INVENTOR.
DANIEL A. ARMSTRONG
BY
Andrus & Sceales
Attorneys

Aug. 28, 1956   D. A. ARMSTRONG   2,760,613
SPRING CLUTCH FOR OUTBOARD MOTORS AND THE LIKE
Filed April 2, 1954   2 Sheets-Sheet 2

INVENTOR.
DANIEL A. ARMSTRONG
BY
*Andrus & Sealen*
Attorneys

United States Patent Office 2,760,613
Patented Aug. 28, 1956

2,760,613

SPRING CLUTCH FOR OUTBOARD MOTORS AND THE LIKE

Daniel A. Armstrong, Thiensville, Wis., assignor to Kiekhaefer Corporation, Cedarburg, Wis., a corporation of Wisconsin Application April 2, 1954, Serial No. 420,634

9 Claims. (Cl. 192—41)

This invention relates to outboard motor clutch mechanisms for interrupting the drive of the shaft whereby the engine may be operated without rotation of the propeller.

The invention provides an improved clutch mechanism which includes a spring clutch element having an actuating end or toe and a control member movable to a position in the path of rotation of the toe to receive the same when driven in a forward direction to effect the disengagement of the clutch mechanism without damage to the spring. In the reverse direction the toe is adapted to override the control member while the latter remains in said position.

The object of the invention is to provide the increased serviceability of the spring clutch particularly by preventing fracturing of the toe upon clutch disengagement at high speeds and by allowing the spring clutch to be driven in a reverse direction without damage as may occasionally otherwise occur.

Another object is to prevent the spring from excessive expansion as when disengaged while operating at high speeds.

The drawings furnished herewith illustrate the best mode of carrying out the invention as presently contemplated and set forth hereinafter.

Figure 1:
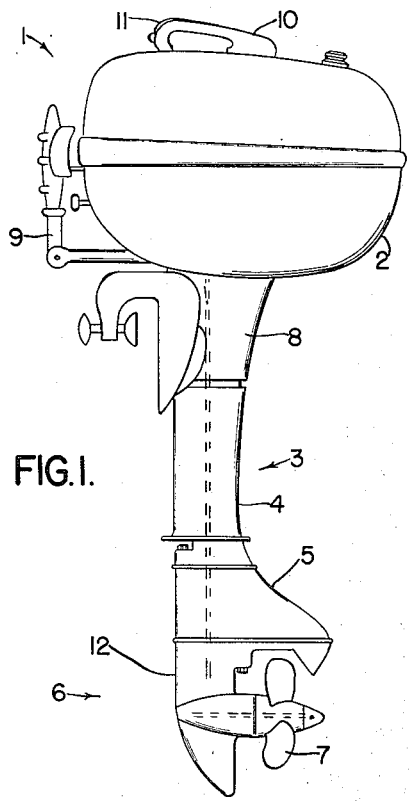
Figure 1 is a side elevation of an outboard motor embodying the clutch unit.
Figure 3:
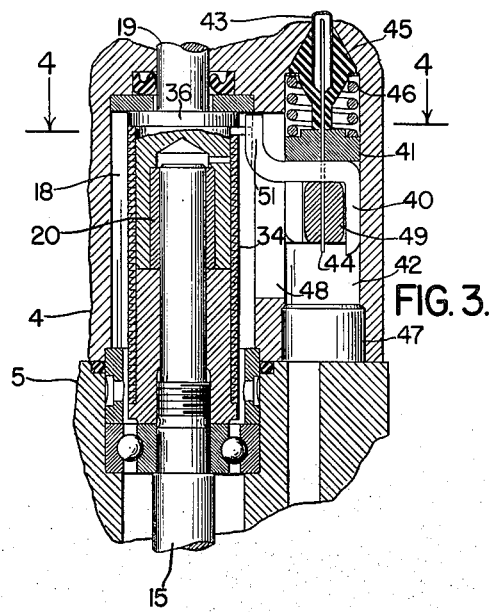
Fig. 3 is a partial view similar to that of Fig. 2 showing the clutch disengaged.
Figure 5:
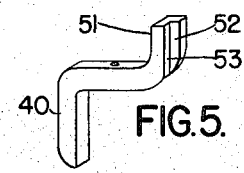
Fig. 5 is a perspective view of the clutch disengaging element.
Figure 4:
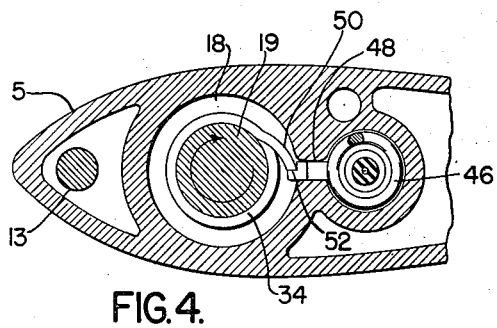
Fig. 4 is a view taken on line 4—4 of Fig. 3.
Figure 6:
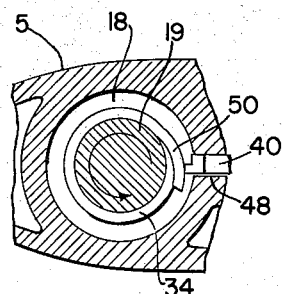
Fig. 6 is a view similar to Fig. 4 showing the spring as turning in the reverse direction.
Figure 7:
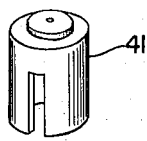
Fig. 7 is a perspective view of the member adapted to carry the clutch disengaging element shown in Fig. 5.
Figure 2:
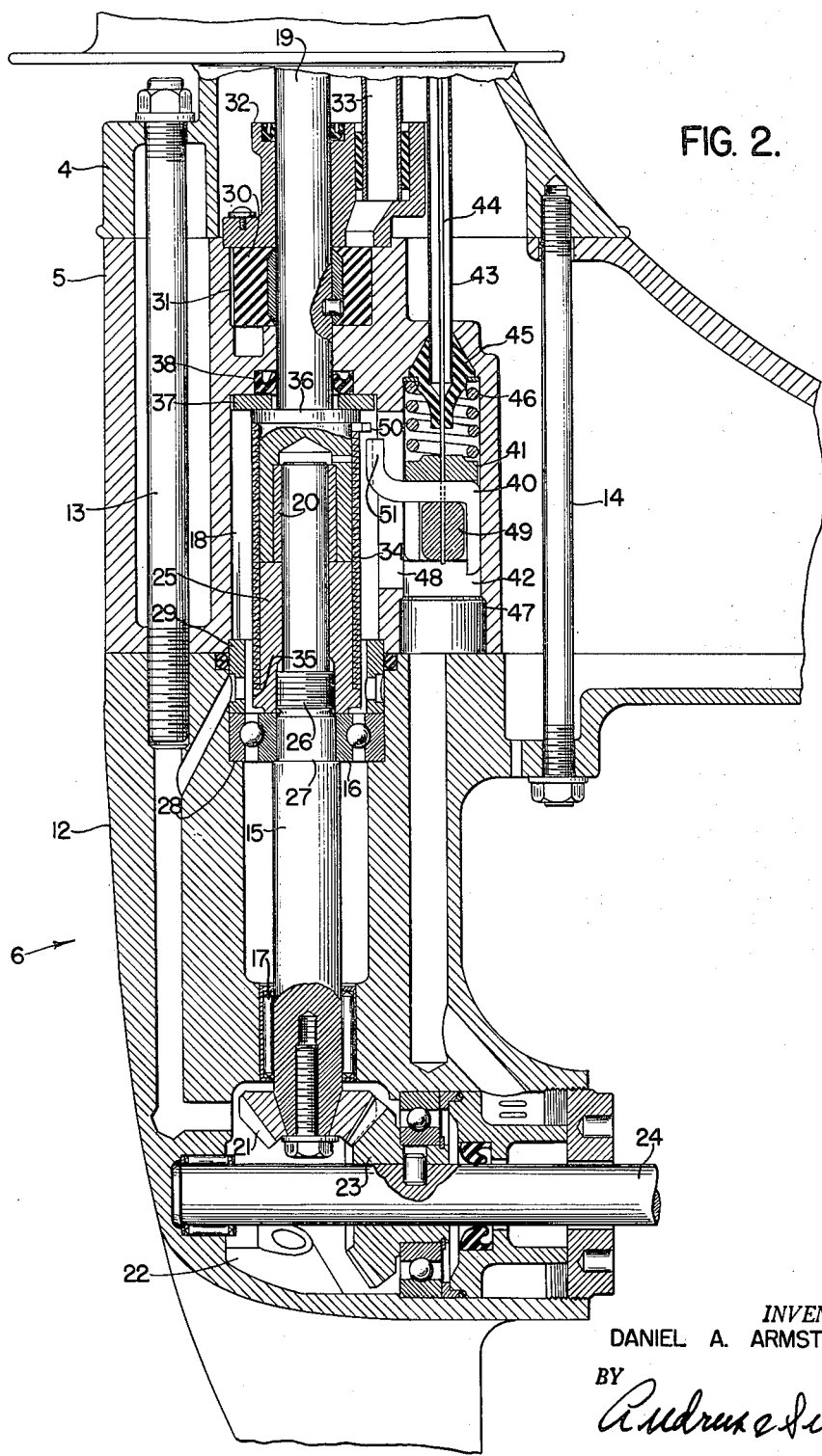
Fig. 2 is an enlarged vertical longitudinal sectional view of the lower end of the outboard motor shown in Figure 1 with the clutch engaged.

The outboard motor unit 1 shown in Figure 1 includes the power head 2 supported by the drive shaft housing 3 comprising the upper and lower members 4 and 5. The lower propeller unit 6 is fixed to the lower end of drive shaft housing member 5 and includes the propeller 7. The upper end of drive shaft housing member 4 is rotatable within the bracket 8 on a vertical axis for steering of the boat, not shown, by turning the motor unit 1 by means of the tiller 9.

The handle 10 at the top of motor unit 1 includes a shiftable lever 11 similar to that described and claimed in the present inventor's copending application for Letters Patent Serial No. 379,795 and filed September 14, 1953, for Outboard Motor With Spring Release Clutch Control.

The upper member 4 of drive shaft housing 3 and the gear case 12 of the propeller unit 6 are joined by the forward and rear vertical tie bolts 13 and 14, respectively, and with lower member 5 disposed between member 4 and gear case 12 to provide a rigid, water tight structure. The driven shaft 15 is carried by the bearings 16 and 17 in gear case 12 and extends therefrom upwardly into the clutch chamber 18 formed in member 5. The upper end of drive shaft 19 is connected to the lower end of the engine crankshaft, not shown, of the power head 2. The end of shaft 19 is fitted with the bearing sleeve 20 to be supported radially on the upper end of driven shaft 15.

The lower end of driven shaft 15 carries the bevel gear 21 within chamber 22 of gear case 12 and meshes with gear 23 mounted on the propeller shaft 24.

The collar 25 secured by the threads 26 on the upper end of shaft 15 supports shaft 19 vertically and secures the inner race of bearing 16 against the upwardly facing shoulder 27 of shaft 15 to secure the bearing and shaft axially. The outer race of bearing 16 is seated against the annular shoulder 28 formed near the upper end of gear case 12 and is secured against the shoulder by the ring 29 which fits a corresponding annular counter-bore defining the lower end of the clutch chamber 18 to drive shaft housing member 5.

The water coolant pump impeller 30 mounted on shaft 19 operates within the pump chamber 31 which is formed in the upper face of member 5 and is closed by the fitting 32 receiving the lower end of water pipe 33.

The lower end of drive shaft 19 fitted with the bearing 20 is enlarged to a circular dimension equal that of the collar 25 to carry the coil spring clutch element 34. Coil spring 34 is restrained between the annular flanges 35 and 36 of collar 25 and drive shaft 19, respectively. The washer 37 which fits between flange 36 of drive shaft 15 and the upper face of chamber 18 of drive shaft housing 5 secures shaft 19 on shaft 15. The seal 38 on drive shaft 19 is located beneath pump impeller 30 and is seated and secured in place by collar 37.

The clutch release member 40 is carried by the plunger 41 which fits within the cylindrical chamber 42 formed adjacent to chamber 18 within drive shaft housing member 5. The upper end of chamber 42 has an opening to receive the tube 43 which carries the cable 44 extending through the rubber seal 45 seated by the spring 46 in the tapered upper end of chamber 42. Spring 46 biases plunger 41 downwardly towards the lower end of chamber 42 closed by the plug 47.

Release member 40 is S-shaped and carried within a slot formed in plunger 41 and projects through the slot 48 formed in housing member 5 to provide communication between chambers 18 and 42. The cast lead slug 49 formed on the end of cable 44 extending through member 40 and plunger 41 serves to secure the release member within the slot formed in plunger 41.

The lower section of the release member 40 rides against the wall of chamber 42 opposite slot 48 and guides the movement of member 40 in slot 48 adjacent to clutch spring 34 to engage the upper end or toe 50 of the clutch spring 34, as will be described.

In the assembly of the lower end of the outboard motor, the coil spring 34 may be mounted on either the collar 25 of the driven shaft 15 or the lower end of drive shaft 19. The drive shaft housing member 5 is assembled with drive shaft 19 and pump impeller 30 and fitting 32 are then slid on the shaft and into place. The member 5 may then be assembled with upper drive shaft housing member 4 so that the lower end of tube 43 enters seal 45 and the lower end of pipe 33 enters the fitting 32. Thereafter, the clutch release spring 46 is assembled in chamber 42 to secure seal 45 and the lower end of tube 43. Cable 44 is drawn down through tube 43 and plunger 41 by passing the end of the cable through the holes therein and the plug 49 is applied to the lower end of the cable. In an alternative and preferred manner, the upper end of the cable, not shown, to be secured for operation by the lever 11 may be passed upwardly through member 40 and plunger 41 and through seal 45 and tube 43 with the plug 49 already secured to the lower end of the cable. After plunger 41 and clutch release member 40 have been inserted in chamber 42, plug 47 is inserted to close the lower end of chamber 42.

The propeller 6 including gear case 12 with the forward tie bolt 13 secured thereto is then assembled with drive shaft housing member 5. The clutch spring mounted on either collar 25 or the lower end of drive shaft 19 is readily made to receive the other by turning either shaft 15 or 19 in the direction which tends to expand the spring 34.

The spring 34 is wound from a spring wire of generally rectangular section and in a direction so that rotation of the drive shaft 19 in a forward direction effects the forward rotation of driven shaft 15. Spring 34 is adapted to be engaged by member 40 to arrest the rotation of the spring whereby the frictional engagement of the spring with collar 25 of driven shaft 15 tends to expand the spring allowing its disengagement and interrupting the rotation of driven shaft 15.

At high engine speeds, and upon movement of abutment member 40 upwardly into the path of rotation of the upper projecting end or toe 50 of spring 34, the resulting impact generally tends to fracture the spring at the toe so that the spring fails to release as a clutch.

According to the invention, the upper end 51 of clutch release member 40 is formed to provide two vertical abutment faces 52 and 53, respectively, disposed at approximately 90° of each other and generally parallel to the axis of rotation of the spring 34. The abutment face 52 is disposed parallel to the axis of rotation of spring 34 as stated above and defines a plane which passes through the axis of rotation of the spring. In the engagement of toe 50 and clutch member 40, the end of the toe 50 engages face 52 and the movement arrested by such engagement tends to force the toe outwardly and into engagement with the face 53 disposed at right angles thereto. Face 53 prevents the toe 50 from being spread too far preventing fracture of the toe or the other parts of the spring and providing a firm seat to receive the end of the toe each time the clutch member 40 is lifted into the path of rotation thereof to engage the same.

Clutch member 40 is constructed to receive the impact of the toe 50 without damage or wear and the upper end of the clutch member is supported against the force of such impact within slot 48 by a substantial area of the aluminum die-casting forming the lower drive shaft housing member 5 so that no damage to the construction of the housing is evidenced after prolonged use of the device.

The axial movement of the clutch member 40 provided for by the movement of plunger 41 in the cylindrical chamber 42 assures the correct and predetermined relationship of the toe 50 and faces 52 and 53 of member 40 irrespective of the degree of movement of the member effected by cable 44 upon engagement of toe 50 with face 52. The location of the clutch in the outboard motor drive shaft housing requires the assembly to be arranged within the narrow lateral dimensions allowed by the necessary streamlining. Toe 50 may be arched as shown so that the toe is self-supporting against its tendency to collapse upon impact with member 40.

Upon reverse rotation of spring 34 on occasion as may occur in outboard motors, toe 50 is adapted to override member 40 with each rotation and without damage. The outer cam surface of the toe engages member 40 and bends the toe inwardly sufficient to pass the member. Such reverse rotation may occur as when the engine misfires.

Member 40 is normally in a lower position clear of toe 50 for normal operation of the motor. When member 40 is raised and misfiring of the engine occurs so that spring 34 is rotated in reverse, the portion of the spring forming the cam is forced toward the axis of drive shaft 19 by member 40 in passing the latter. The arched shape of the cam portion of the spring allows the spring to pass more readily between the member and the drive shaft.

Various modes of carrying out the invention are contemplated as within the scope of the following claims particularly pointing out and distinctly claiming the subject matter which is regarded as the invention.

I claim:

1. In a device of the class described, a spring clutch comprising rotatable cylindrical driving and driven members in axial alignment, a coil spring mounted on said members, said spring having a uniform radius throughout the length thereof with the exception of the end portion of the spring mounted on said drive member which portion has an increasing radius toward the end thereof extending in a direction away from the drive member and forming a toe having that surface which corresponds to the outer circular dimensions of the spring defining a cam generally tangential to said outer circular dimensions of the spring, and an abutment selectively shiftable to a position in the path of rotation of said toe, said abutment being engageable by the end of the toe with normal rotation to release the spring from driving engagement with said driving member, said cam surface of the spring being engageable with said abutment upon reverse rotation and yieldable to override the abutment without damage.

2. The invention of claim 1 wherein the end of the portion of the spring forming the toe is arched generally corresponding to the arcuate form of the spring and the toe is thereby self-supporting upon engagement of the end thereof with the abutment and is more readily adapted to yield and pass between the driving member and abutment upon reverse rotation.

3. In a spring clutch including adjacent rotatable driving and driven members in axial alignment and a coil spring clutch element mounted on said members whereby the rotation of said drive member in a given rotation effects the corresponding rotation of said driven member, said spring element having a uniform radius throughout the length thereof with the exception of a toe formed by the end portion of the coil spring carried by the drive member which portion has an increasing radius toward the end thereof and having that surface which corresponds to the outer circular dimensions of the spring element forming an outer cam surface generally tangential to said outer circular dimensions of the spring element, and an abutment selectively shiftable to a position in the path of rotation of said toe to be engaged thereby so that the further rotation of said drive member frictionally effects the expansion of the portion of the coil spring carried by the drive member and their relative disengagement, said toe and abutment having respectively engaging faces disposed normal to said tangential surface whereby the impact of the toe with said abutment is absorbed by the entire length of the toe and transmitted directly to the coil spring without bending of the toe.

4. In an outboard motor, aligned driving and driven shafts, and a housing therefor having a clutch chamber and a second adjacent chamber, a slot formed in the housing providing communication between said chambers and having sides formed by the housing and extending parallel to said shafts, said shafts carrying cylindrical driving and driven members in said clutch chamber, a coil spring mounted on said members, said spring having a uniform radius throughout the length thereof with the exception of the end portion of the spring mounted on said drive member which portion has an increasing radius toward the end thereof and forms a toe having that surface which corresponds to the outer circular dimensions of the spring defining a cam generally tangential to said outer circular dimensions of the spring, means shiftable in said second chamber and including an abutment member movable in said slot to a position in the path of rotation of said toe, said abutment being supported against displacement by the sides of said housing forming the slot while interrupting the rotation of the spring and driven member and expanding the spring to release the drive member.

5. In a clutch unit, aligned driving and driven shafts and a housing therefor having a clutch chamber and a second adjacent chamber, a slot formed in the housing providing communication between said chambers and having sides formed by the housing and extending parallel to said shafts, said shafts carrying cylindrical driving and driven members in said clutch chamber, a coil spring mounted on said members, said spring having a uniform radius throughout the length thereof with the exception of the end portion of the spring mounted on said drive member which portion has an increasing radius toward the end thereof extending in a direction away from the drive member and forming a toe having that surface which corresponds to the outer circular dimensions of the spring defining a cam generally tangential to said outer circular dimensions of the spring, means shiftable in said second chamber and including an abutment member movable in said slot to a position in the path of rotation of said toe and supported against lateral displacement by the sides of said housing forming said slot, said abutment including adjacent faces relatively disposed approximately at right angles and parallel to the axis of said shafts, one of said faces being generally radial of said axis to be engaged by the end of said toe, and the other of said faces being disposed to prevent deflection of the toe away from said axis.

6. In a clutch unit, aligned driving and driven shafts including cylindrical members in end-to-end relation, a coil spring mounted on said members, said spring having a uniform radius throughout the length thereof with the exception of the end portion of the spring mounted on the driven member which portion has an increasing radius toward the end thereof and forms a toe having that surface which corresponds to the outer circular dimensions of the spring defining a cam surface generally tangential to said outer circular dimensions of the spring, means shiftable in a direction parallel to said shaft and including an abutment member movable to a position in the path of rotation of said toe, said abutment member including adjacent faces relatively disposed approximately at right angles and parallel to the axis of said shafts, one of said faces being generally radial of said axis to be engaged by the end of said toe, and the other of said faces being disposed to prevent deflection of the toe away from said axis.

7. In a clutch unit, aligned driving and driven shafts including cylindrical members in end-to-end relation, a coil spring mounted on said members, said spring having a uniform radius throughout the length thereof with the exception of the end portion of the spring mounted on the drive member which portion has an increasing radius toward the end thereof to form a toe having that surface which corresponds to the outer circular dimensions of the spring defining a cam generally tangential to said outer circular dimensions of the spring, and an abutment member movable to a position in the path of rotation of said toe, said spring end portion being generally arcuate to form an arch between the body of the spring and the abutment member which is adapted to support itself against the forces developed upon engagement of the end of the toe with the abutment member.

8. In a device of the class described, a spring clutch comprising rotatable cylindrical driving and driven members in axial alignment, a coil spring mounted on said members, said spring having a uniform radius throughout the length thereof with the exception of the end portion of the spring mounted on said drive member which portion has an increasing radius toward the end thereof to form a toe having that surface which corresponds to the outer circular dimensions of the spring defining a cam generally tangential to said outer circular dimensions of the spring, an abutment selectively shiftable to a position in the path of rotation of said toe, said abutment having faces parallel to the axis of said spring and disposed approximately at right angles of each other to form a groove disposed to receive said toe upon shifting of the abutment to said position and to support the same while interrupting the rotation of the spring and driven member and expanding the spring to release the drive member.

9. In a device of the class described, a spring clutch comprising rotatable cylindrical driving and driven members in axial alignment, a coil spring mounted on said members, said spring having a uniform radius throughout the length thereof with the exception of the end of the spring mounted on said drive member which portion has an increasing radius toward the end thereof and forms a toe having that surface which corresponds to the outer circular dimensions of the spring defining a cam surface generally tangential to said outer circular dimensions of the spring, an abutment selectively shiftable to a position in the path of rotation of said toe, said abutment having faces parallel to the axis of said spring and disposed approximately at right angles of each other to form a groove disposed to receive said toe upon shifting of the abutment to said position and to support the same while interrupting the rotation of the spring and driven member and expanding the spring to release the drive member, said outer cam surface being engageable with said abutment upon reverse rotation of the spring by the driving or driven element and providing the deflection of the toe inwardly without damage upon such reverse rotation.

References Cited in the file of this patent

UNITED STATES PATENTS

| | | |
|---|---|---|
| 2,052,961 | Bonham | Sept. 1, 1936 |
| 2,185,457 | Conover | Jan. 2, 1940 |
| 2,298,970 | Russell et al. | Oct. 13, 1942 |
| 2,516,269 | Starkey | July 25, 1950 |
| 2,615,543 | Maeser | Oct. 28, 1952 |
| 2,643,749 | Greenlee | June 30, 1953 |